Aug. 13, 1963
L. L. RICE ETAL
3,100,857
CAPACITOR TERMINAL CONNECTION
Filed July 22, 1958
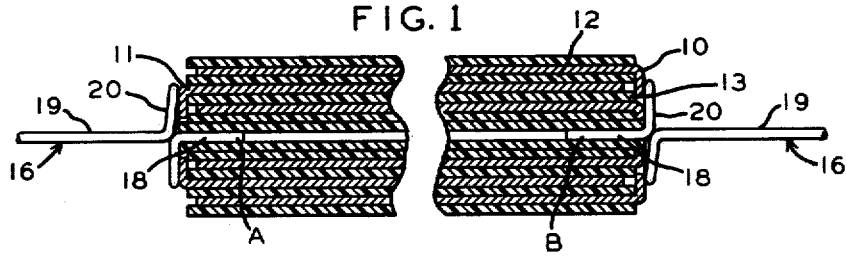
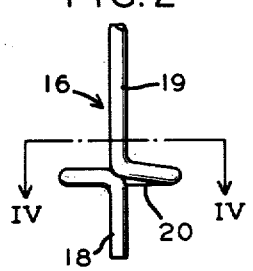
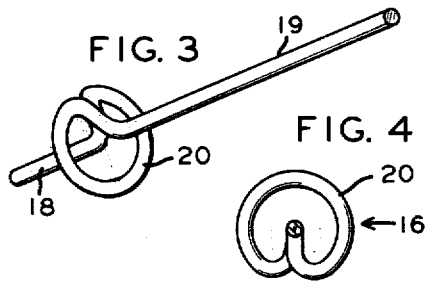
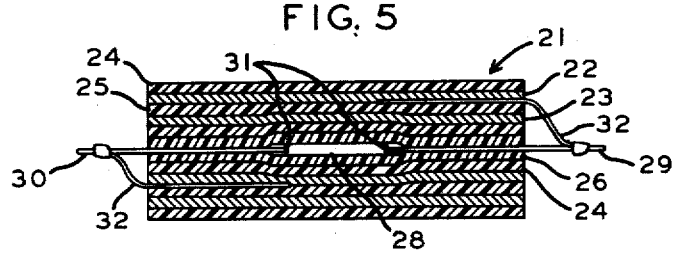
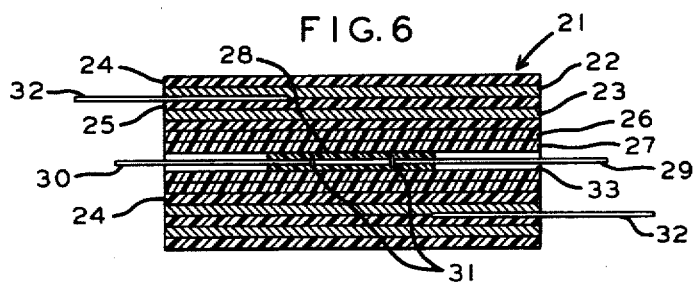
INVENTORS
LIVINGSTON L. RICE
DONATO F. DAGNOLI
BY *Connolly and Hutz*
ATTORNEYS of the invention will be appreciated from context.

United States Patent Office 3,100,857
Patented Aug. 13, 1963

3,100,857
CAPACITOR TERMINAL CONNECTION
Livingston L. Rice, Williamstown, and Donato F. Dagnoli, North Adams, Mass., assignors to Sprague Electric Company, North Adams, Mass., a corporation of Massachusetts
Filed July 22, 1958, Ser. No. 750,139
2 Claims. (Cl. 317—260)

This invention relates to convolutely wound electrical capacitors and more particularly to lead wires for capacitors.

Convolutely wound capacitors made up of two electrode foils of opposite polarity and separated by sheets of dielectric material are wound into a compact form in which thin foils of opposite polarity are wound in alternate layers and separated by intervening thin dielectric films or ribbons. Capacitor lead wires are attached axially into the convolutely wound capacitors to connect the respective foils of the capacitor into electrical circuits. Generally the alternate foils are wound so as to be respectively connectable at opposite ends of the cylinder shaped wound capacitor. The respective lead wires attached at the respective ends each make contact with one of the respective foils. Each lead wire must be attached into the capacitor in such a manner as to maintain permanent electrical contact with its respective thin foil.

A severance of the connection of the lead wire from the capacitor foils disrupts the function of the capacitor and generally destroys its use. Lead wires are of necessity subject to certain tension or pull. Accordingly, it is a problem in the use of capacitors to avoid the destruction of the capacitor by pulling the lead wire out of the capacitor and severing the electrical connection as well as mangling a part of the convolute windings. For these reasons, it is desirable that a lead wire be capable of withstanding a certain amount of strain without being pulled out of the capacitor completely and losing its contact with the electrode foils.

It is important that the electrical connection between the lead wire and the respective electrode foil be permanently maintained in each and every unit. The disconnection of either lead wire in any capacitor construction may be a matter of consequence. At the same time, capacitors of this invention are limited in size and weight so that the components are of relatively frail materials and the augmenting of the physical strength of the components for the purpose of maintaining the electrical connection with the lead wire is not feasible. Similarly, it is not possible to assume a permanent connection by the addition of other connection means such as additional solder.

Further, in some capacitor constructions the maintenance of electrical connection between the capacitive section and the lead wire is assisted by the casing and housing in which the capacitive section is contained. There are capacitor constructions lacking this outer structural containment and support. In such uncased units the retention of the lead wire is aggravated by the absence of structural help of an outer casing. At the same time, the connection between the lead wire and the thin electrode foils in a cased capacitor unit is subject to disruption. While the casing serves to insulate the components within its exterior from exterior shock a certain amount of strain is possible between the components within the casing. This interior strain is most likely to occur at the connection between the lead wire and the thin electrode foils. For example, a capacitor might be mounted in a situation where it was subject to constant, violent vibration which over a substantial period of time could cause a loosening of components even as to those that are packed within a capacitor housing. A further consideration of capacitor terminal connections involves the intermediate product during processing. Regular manufacturing procedures require the handling of partially completed or uncased assemblies. In these assemblies the lead wires are attached to capacitive sections prior to final encasement. In such condition they are vulnerable to the shocks with which the manufacturing procedures are fraught.

It is an object of this invention to provide a terminal connection for capacitors in which the above related disadvantages are eliminated or avoided.

It is another object of this invention to provide a convolutely wound capacitor having a connection between the terminal lead wire and the thin electrode foils which is resistant to physical shock and vibration.

It is a further object of this invention to provide a capacitor lead wire which gives partially under an endwise pull without loss of electrical connection or disruption of the capacitor structure.

It is a further object of this invention to provide a means and method of mounting of a lead wire in a convolutely wound capacitor by conventional means to produce a finished capacitor in which the lead is secured and maintains electrical contact despite some axial displacement.

These and other objects of this invention will be more clearly understood from the following description taken together with the accompanying drawings in which:

FIG. 1 is a sectional view of a convolutely wound capacitor assembly having a lead wire of this invention;

FIG. 2 is a vertical elevation of the end of a lead wire of this invention;

FIG. 3 is a perspective view of a terminal lead wire of this invention;

FIG. 4 is a plan view of the end of the lead wire taken along the line IV—IV of FIG. 2;

FIG. 5 is a sectional view of another convolutely wound capacitor assembly in complete form showing another form of lead wire anchored in the capacitor assembly; and FIG. 6 is a sectional view of the capacitor assembly of FIG. 5 as wound together and in uncompleted form.

According to this invention a convolutely wound capacitor has lead wires which are connected in such a manner that the connection between a lead wire and its respective electrode foil is not severed or otherwise broken by partial axial displacement of the lead wire and shock or vibration and the lead wire is secured in the capacitor assembly against easy removal.

The convolutely wound capacitor incorporating this invention is impregnated with an impregnant which becomes solid upon impregnation into the capacitor. The lead wire incorporated in this convolutely wound solid impregnated capacitor is securely held in the capacitor by the solid impregnant. The lead wire is formed so as to be anchored in the capacitor by a part of the lead wire and to be freely moving with respect to another part of the lead wire. The lead wire is provided with a loop or curlicue described in a plane generally radial to the axis of the capacitor. This loop divides the lead wire into two parts having relative mobility with each other. One of the relatively movable parts is gripped in the convolutely wound capacitive section by the solid impregnant. Another part of the lead wire of this invention is separated from the anchored part by the intermediate loop. This other part includes the exterior part of the lead wire. Thus, it is possible for the loop to allow an unwinding and uncoiling of the terminal lead wire over an axial pull of the long arm part of the lead wire.

It is a feature of this invention that the external part of the lead wire is movable with relation to the other part of the lead wire and the remainder of the capacitor construction without severing its electrical connection to these parts or completely losing its grip in the capacitor.

Referring to FIG. 1 a capacitor assembly is shown made up of a pair of convolutely wound foils 10 and 11 separated by dielectric strips 12 and 13, also convolutely wound. The foils alternate with the dielectric strips in the conventional manner so that the foils 10 and 11 are insulated from each other. The dielectric strips and the electrodes are wound so that one edge of each of the foils 10 and 11 extends from opposite sides of the dielectric films 12 and 13 in accordance with the conventional non-inductive construction of convolutely wound capacitors. A lead wire 16 is attached at each end of the capacitive section. The contact of the lead wires 16 is made each with one of the respective foils 10 or 11 at the respective ends of the capacitor. Each of the leads 16 is made up of a tail section 18, an externally extending section 19, and a radial loop 20. The radial loop overlies and contacts the extended foil edges at its respective end of the capacitor. Each tail 18 projects into the convolutely wound construction at the center. In the interleaved convolutely wound assembly of foils and dielectric films the initial turn is of the dielectric material alone. The tail 18 is interpositioned in these central turns of the dielectric material, and thus neither tail 18 is in contact with electrode foils 10 and 11.

In FIG. 2 an elevation of part of the lead wire 16 shows the tail 18 and externally extending section 19 joined by radial loop 20. The tail 18 and the external section 19 are connected only through the loop 20. The loop 20 is formed in the lead by a process which shortens a length of straight lead wire. This foreshortening may be achieved by any method which creates the loop 20 between the two straight sections.

In FIG. 3 the relative axial disposition of the two ends, tail 18, and external section 19 of the lead wire 16 is illustrated. The curlicue nature of the loop 20 places the tail 18 and the section 19 in general axial alignment but in complete physical disconnection except for the intermediate loop 20. As shown in FIG. 3 the loop 20 is essentially perpendicular in outline. The axially extending tail 18 and external section 19 both axially leave the plane of the loop 20 at approximately the same area. As shown in FIG. 3 and in FIG. 4 this point of axial departure is central of the loop 20. As a result both the tail 18 and external section 19 are oriented along lines perpendicular to the radial plane of the loop.

Referring again to FIG. 1 it is seen that the respective leads 16 seat against the extended foils at their respective ends of the convolutely wound assembly. In this position each radial loop 20 lies against the foils in a substantially radially extending position with respect to the wound assembly. With the respective leads thus positioned, the tail 18 and the external section 19 are oriented coaxially with the wound assembly. The tail 18 is inserted into the central dielectric turns of the assembly as indicated at A and B. The external section 19 of each of the leads extends along the same line outward from the end of the wound assembly and therefore axially in the manner of conventional lead position for this type of capacitor construction. The radial loop 20 in effect extends radially from these lines of orientation of the tail 18 and the external section 19. The loop lies over the end of the respective extended edges of several turns of the respective foil and maintains contact therewith. The lead is looped or bent so as to be reversed on itself at least once and from at least one 180° angle. In the embodiment illustrated, the lead forms a complete 360° arc.

The finished capacitor assembly with leads 16 in position as described above is impregnated with an impregnant which is polymerizable in situ to the solid state. A suitable impregnant which polymerized to a solid is N-vinyl carbazol which may be polymerized in situ to form a solid impregnant gripping the tails 18 of the lead wires 16 in the convolutely wound assembly. The impregnant serves the other customary functions of an impregnant including the filling of voids. The impregnated capacitor with the leads gripped in place may be subsequently encased for use in an outer casing of a mineral filled thermoset resin such as phenol formaldehyde, also urea formaldehyde, urea melamine, alkyds such as the product of phthalic anhydride and glycerol compression molded of silicone and epoxy types may be molded into an encasement.

The capacitor structure of this invention when completed is made up of the convolutely wound assembly with lead wires 16 positioned on the respective ends and an in situ polymerized impregnant gripping the lead wires to the assembly by suitable adhesion of the solid impregnant to the tail portion 18 interposed into the wound assembly. This structure may or may not be contained in a casing or jacket. The capacitive section and lead wires assemblies may also be used as an unencased unit. In such a construction the outer casing is omitted and the value of the arrangement of this invention is magnified. When this invention is incorporated into an uncased unit the function of the loop 20 serves to replace some of the function performed by a capacitor casing particularly in avoiding the effect of shock, vibration and physical displacement at the connection between the lead wire and the capacitive section. This same function of the invention is employed in protecting the assembly during the manufacturing process and before encasement.

In the use of the capacitor structure of this invention, the structure is attached into an electrical circuit by having the leads suitably connected. The capacitor during its use both before and after connection into an electrical circuit has inflicted upon it through the leads various physical strains. These may range from simple handling of the structure to a forceable endwise pull on the lead.

The respective tails 18 are gripped in the wound assembly and the external sections 19 are partially independently movable with respect to the wound assembly and the tail 18. Vibration, pull and other dislodgement or disturbances of one of the lead wires may result in substantial movement of the external section 19 of the wire. This disturbance is first translated to the loop 20. At the loop 20 the effect of the disturbance on the capacitor structure is absorbed. Because in the loop 20 the lead reverses on itself, the portion of the loop most adjacent the external section 19 may be moved but it will not be moved axially out of contact with the electrode foil without substantially more than normal amount of physical dislodgement. In some constructions the lead wire is secured to the electrode foils by a solder connection in which a deposit of solder is attached to both the lead wire and the respective electrode foil. In subesquent treatment of the resultant assembly this solder deposit may be pulled away either from the lead or from the foil. In the device of this invention such a pulling away of the solder, is as for example with uncoiling of the loop, is counteracted both by the resistance to such pull which is offered by the anchoring tail 18 and also by a section of the loop 20 remaining in low resistance contact with the respective electrode foil. The partial uncoiling of the loop 20 still leaves enough of the loop 20 in contact with the extended foil to maintain good electrical contact.

As a result the lead wires 16 may be subjected to an end pull of several pounds without disconnecting the contact with the respective foil. The pull will cause the external section to move axially of the assembly but will not result in a disengagement of the respective tail 18 from the wound assembly. The assembled capacitor structure with the solid impregnant holding the lead wires 16 in the wound assembly is capable of taking substantial physical disturbance at the lead wires. In normal use, the amount of axial pull exerted on the leads of a capacitor will not exceed the limit of pull which can be tolerated by the looped lead wire construction of this invention.

Consequently, capacitors will not be pulled apart when the lead wire incorporates the loop described herein.

It will be seen that among other advantages the construction of this invention serves to interpose a shock absorber between the sections of the lead wire. The portions which are in contact with the electrical foils and which are more subject to physical movement are secured in the wound assembly or isolated from the portions of the lead wire. As a result the completed capacitor will withstand considerable vibration and shock. The electrical efficacy of the capacitor will not be impaired by an endwise movement of the outer portion of the lead wire, such as would utterly destroy a device of the prior art.

This invention substantially reduces the occurrence of capacitor failure due to lead loosening. This is an advantage as little foil is provided for anchoring the lead wire in some capacitor constructions, and in some uses the failure of a single capacitor is of paramount concern. Further, a better connection is provided with no extra material, thus assisting light weight considerations. The capacitor unit with the invention withstands shock and vibration. Further, some axial movement of capacitor leads can now be tolerated without loss of electrical proficiency.

In the illustrated embodiment of this invention the external section 19 extends axially from the capacitor section. The construction can be modified and the external section 19 may be extended radially of the capacitance section on being bent down parallel to the loop 20. This construction has the same advantages as the axially extending construction in being capable of withstanding a greater pull than previous leads.

It will be understood that the above-described embodiment has been set forth for the purpose of illustration only and that this invention can be incorporated in virtually all convolutely wound capacitors whether made up of a strip of paper, film or other combination of these dielectrics. It is a feature of this invention that the solid impregnant in the convolute windings locks around the tail 18 to secure the lead wire in the convolute windings. This impregnant is not limited to the N-vinyl carbazol mentioned above but may be any which will polymerize in situ to the solid state, such as polystyrene as well as its copolymers, polyesters such as, for example, the copolymer of bisphenol, hexalene glycol, dibenzylic acid and itaconic acid. Other modifications include the material of the dielectric spacers which need not be calendered kraft paper but may be made up of resinous films. Similarly though foils have been indicated in the figure and described, metallized dielectric films are equally satisfactory for this purpose. The metallized layer would be imposed on the surface of the paper spacer. In the capacitance section the metallized layers would alternately extend from alternate ends of the wound assembly.

In FIGURES 5 and 6 capacitors are shown in which axially extending leads are anchored in convolutely wound capacitance sections. In FIGURE 5 an assembled capacitor 21 is shown made up of a pair of metal foils 22 and 23 wound between ribbons of suitable dielectric such as Mylar (a polyterephthalate resin of Du Pont Company, Wilmington, Delaware), and polystyrene. Ribbons 24 and 25 of Mylar alternate with the foils 22 and 23 in conventional manner so that the foils are insulated from each other and can be oppositely polarized. Strips 26 and 27 of polystyrene are wound around mandrel 28 at the center of the capacitor 21. The strips 26 and 27 are interleaved with the ribbons 24 and 25 and the foils 22 and 23. In the assembly of the capacitor 21 this is accomplished by first winding the strips 26 and 27 around the mandrel 28 alone and then interleaving strips 26 and 27 with ribbons 24 and 25 and foils 22 and 23. When the end of strips 26 and 27 have been reached the winding of these strips terminates so that the interleaved layers are of alternate ribbons 24 and 25 interleaved between the alternate foils 22 and 23.

At the center the mandrel 28 has embedded therein a pair of oppositely extended leads 29 and 30. The leads 29 and 30 extend axially from the capacitor 21 at the respective ends thereof. A head 31 on each of the respective leads 29 and 30 are embedded therein. A pair of conducting tabs 32 are inserted into the body of the interleaved foils 22 and 23 and ribbons 24 and 25 so that one is connected to foil 22 and the other is connected to foil 23. The tabs 32 extend diametrically from the convolutely wound capacitor body and have free ends attached to the respective lead 29 or 30. The capacitor 21 is assembled to the partially assembled condition shown in FIGURE 6 in the following manner. The thin strips 26 and 27 of polystyrene are wound around the mandrel 28 to form a tube shape around a central passage 33. The leads 29 and 30 are inserted in opposite ends of the hollow mandrel 28, each having its head 31 inserted substantially into the mandrel 28. The inductive winding of the capacitor 21 consisting of the alternate layers 22, 24, 23, 25 is interleaved with the polystyrene strips 26 and 27 and wound with the interleaved polystyrene for a few turns around the mandrel 28.

It is pointed out above that strips 26 and 27 terminate so that the outer turns are made up of the ribbons 24 and 25 in the foils 22 and 23 convolutely wound. The assembly is then cured at a temperature high enough to cause the polystyrene film and mandrel to shrink around the leads 29 and 30 and their heads 31 so that the leads 29 and 30 are embedded in the polystyrene layers 26, 27 and the mandrel 28 and securely gripped therein. The strips 26 and 27 and the mandrel 28 are fused and joined by the shrinkage of heating. Then the ends of the tabs 32 are clamped around the respective adjacent leads and either welded or soldered to the leads 29 and 30 to provide an electrical connection between the respective leads and foils.

The resultant finished construction is such as shown in FIGURE 5. At the center of the capacitor 21 the polystyrene is a plug 28 which is fused to the shrunken strips 26 and 27. The plug 28 is embedded therein the heads 31 of the leads 29 and 30 which extend diametrically from the plug 28 and with other ends of the capacitor 21. The polystyrene plug 28 is fused to surround and contain the leads 29 and 30 which are retained therein. The curing step for shrinking the polystyrene around the nail heads 31 is carried out at approximately 150° C. for 45 to 75 seconds. The time variation depends upon the size of the unit constructed and the resultant period necessary for obtaining satisfactory shrinkage of the polystyrene.

A modification of the described embodiment may be had by a pre-assembly of the nail head leads in a plug of polystyrene material which is shrunken onto the nail head leads. The plug-leads sub-assembly thus formed may receive the alternate foils and resin ribbons of the capacitor assembly which are convolutely wound around the plug-leads combination which thus takes the place of the mandrel as described above in the assembly of the capacitor. The convolutely wound section of the capacitor may be impregnated such as for use at interelectrode potentials of 100 volts or less, or they can be impregnated for higher voltages. Suitable impregnants are mineral oil, silicone oils (such as those described in the Obenhaus U.S. patent application Serial No. 591,065, filed June 13, 1956), chlorinated diphenyl, chlorinated naphthalene, castor oil, and the polymer described in U.S. Patent 2,711,498, granted June 21, 1955.

The above-described embodiments of capacitor terminal connections have been set forth for the purpose of illustration. It is intended that the following claims define the scope.

What is claimed is:

1. A capacitor comprising a convolute winding of a plurality of electrodes with dielectric material therebetween, a lateral edge of one electrode of said plurality extending beyond an end of said winding, a lead-wire having a first end and a second end and an intermediate portion formed into a loop substantially normal to said first end, said lead-wire secured to said winding with said first end within said dielectric material and with said loop in electrical contact with said extending edge, whereby a force applied to said second end will uncoil said loop before disengaging said lead-wire from said winding.

2. An electrical capacitor comprising a capacitance section having electrode foils convolutely wound and separated by dielectric spacers, a lateral edge of one of said foils extending beyond an end of said section to permit electrical connection thereto, a lead-wire having a first end substantially coaxial with a second end, a portion of said lead-wire between said first end and said second end being coiled substantially radially, said section being impregnated with a solid dielectric material, said first end of said lead-wire being secured in said solid dielectric material with said coiled portion being joined to said extended foil over substantially the entire extent of the coil, whereby an elongating force on said second end will effect unwinding of said coiled portion in preference to disengaging said lead-wire from said section.

References Cited in the file of this patent

UNITED STATES PATENTS

| | | |
|---|---|---|
| 1,960,944 | Knudsen | May 29, 1934 |
| 2,476,429 | Paules | July 19, 1949 |
| 2,579,462 | Barnard et al. | Dec. 25, 1951 |
| 2,777,117 | Shrider | Jan. 7, 1957 |

FOREIGN PATENTS

| | | |
|---|---|---|
| 718,517 | Great Britain | Nov. 17, 1954 |

UNITED STATES PATENT OFFICE
CERTIFICATE OF CORRECTION

Patent No. 3,100,857                                August 13, 1963

Livingston L. Rice et al.

It is hereby certified that error appears in the above numbered patent requiring correction and that the said Letters Patent should read as corrected below.

Column 1, line 65, for "exterior", first occurrence, read -- interior --; column 8, list of References Cited, under UNITED STATES PATENTS, add the following reference:

2,011,555 Burlingame----Aug. 13, 1935

Signed and sealed this 28th day of April 1964.

(SEAL)
Attest:

ERNEST W. SWIDER                                EDWARD J. BRENNER

Attesting Officer                                     Commissioner of Patents